(12) United States Patent
Mabuchi et al.

(10) Patent No.: US 9,225,544 B2
(45) Date of Patent: Dec. 29, 2015

(54) COMMUNICATION SYSTEM AND COMMUNICATION METHOD

(75) Inventors: Mitsuhiro Mabuchi, Tokyo (JP); Kazuhiro Okude, Kobe (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/366,465

(22) PCT Filed: Dec. 22, 2011

(86) PCT No.: PCT/JP2011/079934
§ 371 (c)(1),
(2), (4) Date: Jun. 18, 2014

(87) PCT Pub. No.: WO2013/094072
PCT Pub. Date: Jun. 27, 2013

(65) Prior Publication Data
US 2014/0328352 A1  Nov. 6, 2014

(51) Int. Cl.
*H04L 12/40* (2006.01)
*H04L 12/403* (2006.01)
*H04L 29/06* (2006.01)

(52) U.S. Cl.
CPC ............. *H04L 12/4035* (2013.01); *H04L 63/00* (2013.01); *H04L 63/14* (2013.01); *H04L 2012/40215* (2013.01); *H04L 2012/40273* (2013.01)

(58) Field of Classification Search
CPC ........ H04W 4/046; H04W 12/06; B60D 7/00; G11C 16/22; G11C 7/24
See application file for complete search history.

(56) References Cited

U.S. PATENT DOCUMENTS

| 6,357,014 B1 * | 3/2002 | Correia .................... 713/502 |
| 6,516,364 B1 * | 2/2003 | Kolblin et al. ............. 710/100 |
| 2005/0190619 A1 | 9/2005 | Wakiyama |

(Continued)

FOREIGN PATENT DOCUMENTS

| JP | 11-177586 | 7/1999 |
| JP | 2005-242871 | 9/2005 |

(Continued)

OTHER PUBLICATIONS

International Search Report issued Jan. 24, 2012, in PCT/JP11/079934 filed Dec. 22, 2011.

(Continued)

*Primary Examiner* — Curtis A Alia
(74) *Attorney, Agent, or Firm* — Oblon, McClelland, Maier & Neustadt, L.L.P.

(57) ABSTRACT

To provide a communication system and a communication method that are capable of determining with a simple configuration the validity of a message that is communicated with the communication system, a plurality of ECUs is connected in the communication system to a communication bus, allowing communication of messages. A communication interval, which is defined for each message being communicated, is set for each ECU. The ECU that transmits the message transmits the message on the basis of the defined communication interval. The ECU that receives the transmitted message detects the communication interval of the received message, and determines the validity of the received message on the basis of a comparison between the detected communication interval and the defined communication interval.

12 Claims, 6 Drawing Sheets

(56) References Cited

U.S. PATENT DOCUMENTS

2010/0299466 A1* 11/2010 Asano et al. .................. 710/105
2011/0016362 A1* 1/2011 Holzaepfel et al. ............. 714/51

FOREIGN PATENT DOCUMENTS

| JP | 2007-67812 | 3/2007 |
| JP | 2008-219551 | 9/2008 |
| JP | 2011-119899 | 6/2011 |
| JP | 2013-60047 | 4/2013 |
| JP | 2013-98719 | 5/2013 |
| JP | 2013-138304 | 7/2013 |

OTHER PUBLICATIONS

Extended European Search Report issued Mar. 31, 2015 in Patent Application No. 11877833.1.

Michael Muter, et al., "A Structured Approach to Anomaly Detection for In-Vehicle Networks" 2010 Sixth International Conference on Information Assurance and Security, XP031777189, Aug. 23, 2010, pp. 92-98.

* cited by examiner

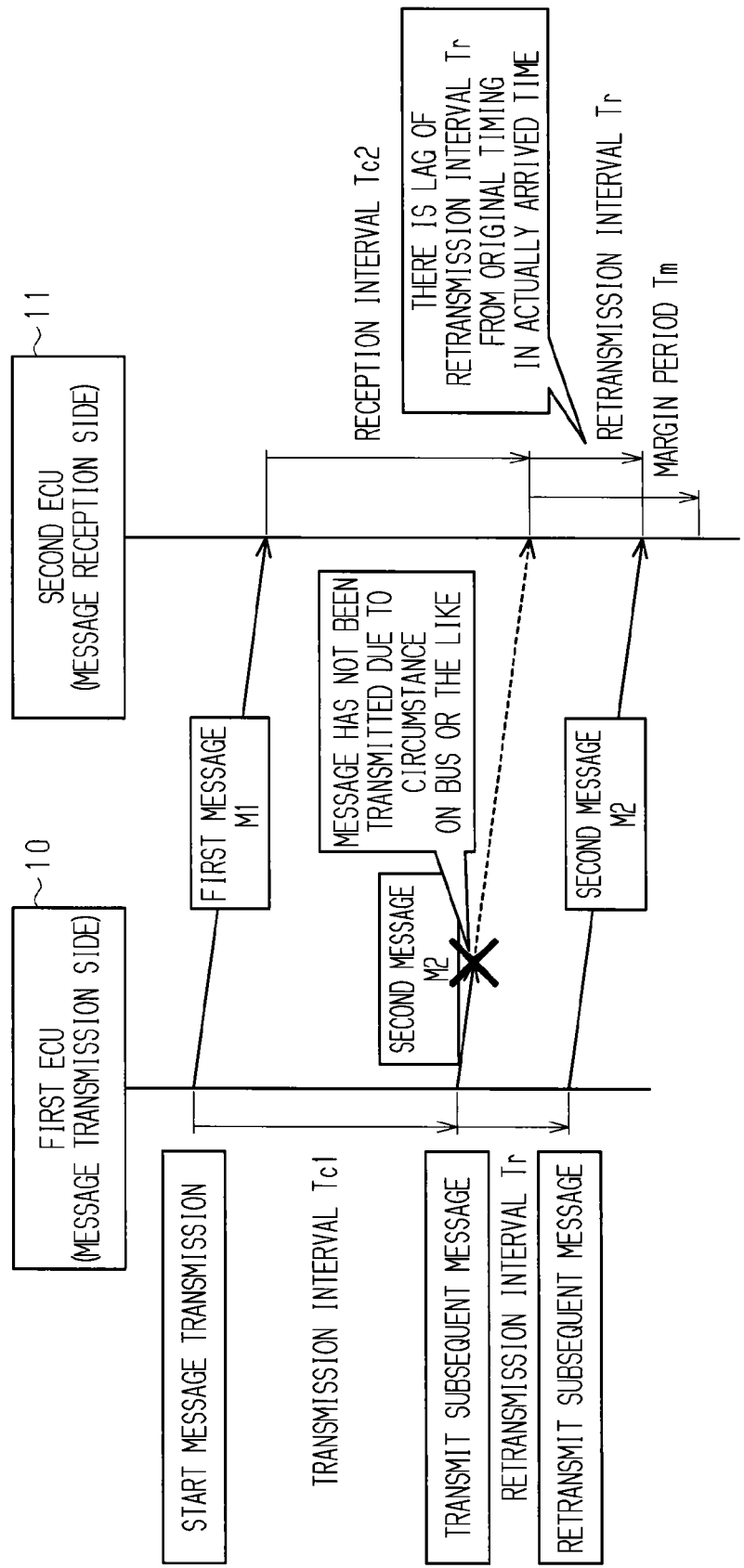

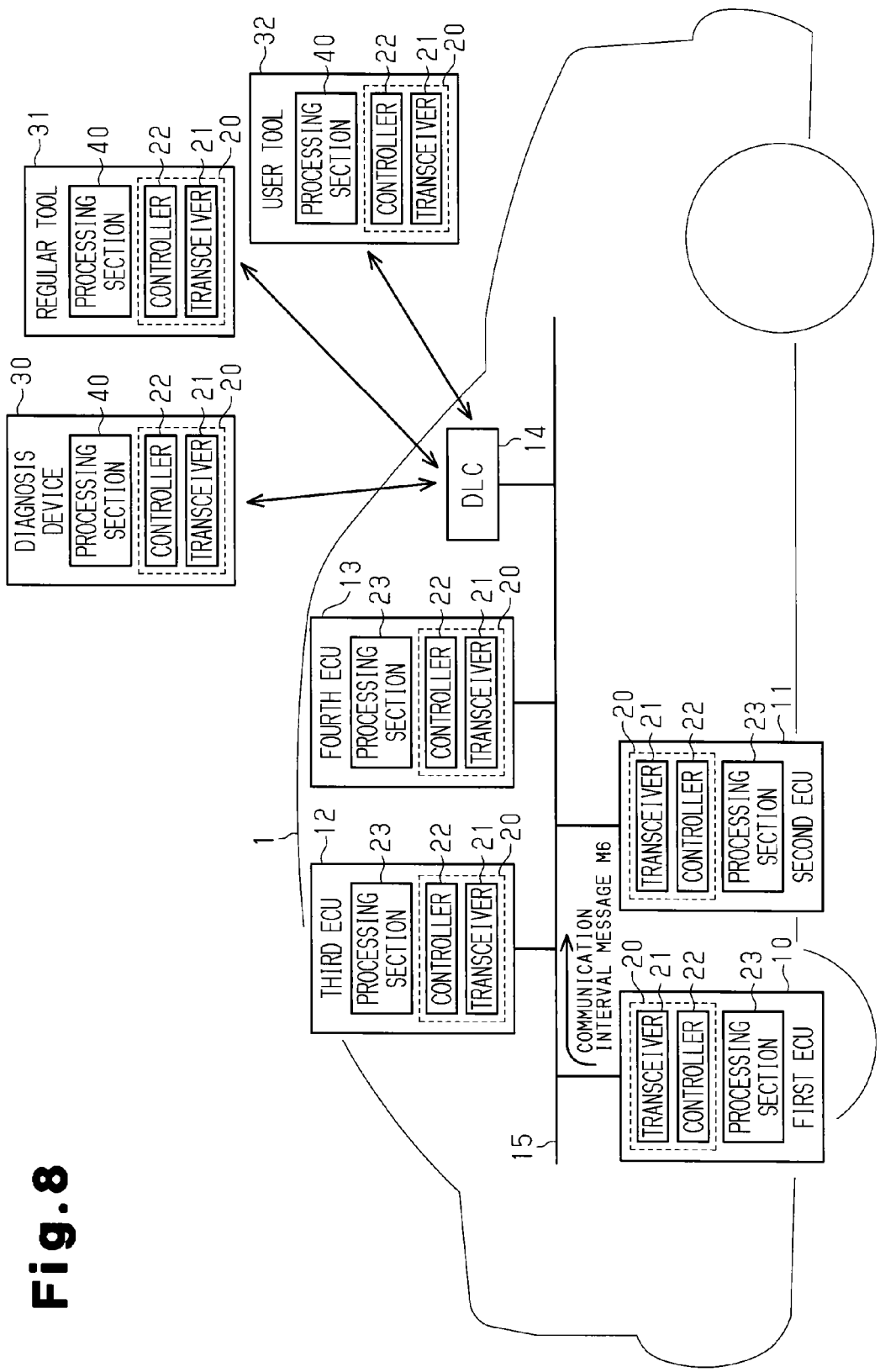

COMMUNICATION SYSTEM AND COMMUNICATION METHOD

FIELD OF THE DISCLOSURE

The present invention relates to a communication system in which communication devices are connected via a network in a vehicle or the like and to a communication method.

BACKGROUND OF THE DISCLOSURE

As well known, electronic control units (ECU) mounted on a vehicle are connected via a network and can mutually communicate information (vehicle information) possessed by the electronic control units, configure a communication system, that is, a vehicle network system, in many cases. Further, a control area network (CAN) is known as one of such vehicle network systems.

Since the CAN is configured such that each of the ECUs sharing a bus, which is a communication line, can circulate a message to the bus by determination of each ECU, it is easy to transmit the message from each ECU to the bus. Therefore, for example, an invalid ECU can be connected to the bus of the CAN to transmit an invalid message to the bus. Further, when such an invalid message is transmitted, there is a concern that the invalid message may be processed in the same manner as a regular message in the ECU receiving the invalid message.

Accordingly, in the conventional art, for example, technologies for detecting an invalid ECU transmitting an invalid message have been suggested. An example of the technology is disclosed in Patent Document 1.

In a communication system disclosed in Patent Document 1, a plurality of ECUs and one gateway are connected to a communication line in a vehicle to mutually communicate with each other. Each of the ECUs transmits a hash value of data stored in the own device to the gateway when the ignition switch is turned OFF. The gateway receiving the hash value stores the transmitted hash value of each ECU as comparison data in an EEPROM. On the other hand, each ECU starting operation at the time when the ignition switch is turned ON transmits the hash value of the stored data to the gateway. Thus, for each ECU, the gateway compares a newly transmitted hash value to the corresponding comparison data (hash value) stored in the EEPROM. Then, when it is determined that the comparison result is not identical, the data of the ECU is determined to be falsified. Thus, since the falsified ECU can be reliably detected, it is possible to eventually prevent an invalid message from being transmitted from the ECU to the bus of the CAN.

PRIOR ART DOCUMENTS

Patent Documents

Patent Document 1: Japanese Laid-Open Patent Publication No. 2005-242871

SUMMARY OF THE INVENTION

Problems that the Invention is to Solve

Incidentally, for example, a vehicle diagnosis device prepared by a manufacturer or a car dealer or a device for updating a program of an ECU can be connected to a vehicle CAN via a data link connector (DLC) serving as a connection terminal to the CAN. In recent years, in addition to the above-described vehicle diagnosis device and the like, there has been an increasing number of devices prepared by users that can be connected to a CAN via the above data link connector. Therefore, it is also necessary to determine whether an invalid message is transmitted by the device or the like prepared by the user.

However, the communication system disclosed in Patent Document 1 described above can detect falsification of an ECU connected when the ignition switch is turned off and on. For a device connected via the DLC irrespective of the state of the ignition switch, it cannot be determined whether falsification has occurred.

An objective of the present invention is to provide a communication system and a communication method capable of determining validity of a message communicated in the communication system with a simple configuration.

Means for Solving the Problems

Means for achieving the above objective and advantages thereof will now be discussed.

To achieve the foregoing objective and in accordance with one aspect of the present invention, a communication system is provided in which a plurality of communication devices is connected to a communication line to communicate a message. A communication interval defined for the message to be communicated is set in the communication devices. The communication device transmitting a message transmits the message based on the defined communication interval. The communication device receiving the transmitted message detects a communication interval of the received message and determines validity of the received message based on comparison between the detected communication interval and the defined communication interval.

In accordance with another aspect of the present invention, a communication method is provided that is used in a communication system is in which a plurality of communication devices is connected to a communication line to communicate a message. The communication method includes setting a communication interval defined for the message to be communicated in the communication devices. Each time the communication device transmitting a message transmits the message based on the set communication interval, the communication device receiving the message detects a communication interval of the received message and determines validity of the received message based on comparison between the detected communication interval and the defined communication interval.

According to the configuration or the method, the communication device transmitting the message and the communication device receiving the message share the communication interval defined for the message communicated between the communication devices. Thus, the communication device receiving the message can detect the communication interval of the received message and determine the validity of the communicated message based on the comparison between the detected communication interval and the defined communication interval. Specifically, the communication device receiving the message determines that the message received at the defined communication interval is the regular message and determines that the message received out of the defined communication interval is an invalid message. Thus, since the invalid message mixed with the communicated messages is detected, the invalid message is excluded from the received messages. That is, in the communication system, the validity of the messages communicated among the communication devices is determined with a simple configuration.

In accordance with a preferable configuration, the communication line is a communication line conforming to a protocol of a control area network, and the message to be communicated is a message based on the protocol of the control area network.

In accordance with a preferable method, the message to be transmitted and the message to be received are communicated as messages based on a protocol of a control area network.

According to the configuration or the method, the validity of the message communicated by the protocol of the control area network (CAN) can be determined based on the defined communication interval. In the CAN, the communication device connected to the bus can start communication by self-determination, that is, each communication device can transmit the message on the bus according to a circumstance. Therefore, addition or the like of a communication device to the communication line serving as the bus can be flexibly performed. Thus, by simply determining the validity of the message, it is possible to improve reliability of a communication system configured by a CAN system.

In accordance with a preferable configuration, the defined communication interval is caused to correspond to an identifier of the protocol of the control area network, and the communication device transmitting the message selects the defined communication interval based on the identifier of the protocol of the control area network granted to the message.

The communication interval of the message is normally determined for each identifier granted to the content of the message, that is, each content of the message in the CAN protocol. Therefore, according to the configuration, the management or selection of the defined communication interval is configured to be performed to correspond to the content of the message. The identifier can be recognized in the CAN by a CAN controller performing the message communication process conforming to the CAN protocol. Therefore, the CAN controller can select the communication interval defined based on the identifier and can easily transmit the message at the defined communication interval. Thus, it is possible to improve the applicability to the communication system.

In accordance with a preferable configuration, the communication device receiving the message selects the defined communication interval used for the determination of the validity of the message based on the identifier of the protocol of the control area network granted to the message.

According to the configuration, since the defined communication interval is selected based on the identifier recognizable by the CAN controller, whether the message is received at the defined communication interval can be easily determined, that is, the validity of the message can be easily determined.

In accordance with a preferable configuration, the communicated message is one type of a plurality of types of messages, and the communication interval is defined for each of the plurality of types of messages.

According to the configuration, the validity of the communicated message is determined for each of the plurality of types of communicated messages based on each corresponding defined communication interval. Thus, the communication system can also determine validity of various messages to be communicated for the messages.

In accordance with a preferable configuration, the defined communication interval is delivered from the communication device transmitting the message to each communication device.

According to the configuration, even when the communication interval defined for the communicated message is not set in the communication device receiving the message, the defined communication interval is properly set in the communication device receiving the message and the communication device receiving the message can determine the validity of the message communicated based on the defined communication interval. Thus, it is possible to improve the applicability or convenience of the communication system.

Even for a message transmitted by a regular device such as a diagnosis device or an updating device that are prepared by a manufacturer or a car dealer and connected to the communication line (CAN bus) via the data link connector, the communication interval defined for the message communicated from this device can be delivered to the communication system. Thus, in the communication system, it is possible to determine the validity of the message from the device connected via the data link connector.

Further, since the defined communication interval can be dynamically changed, it is possible to improve the security.

Accordingly, it is also possible to improve the applicability or convenience of the communication system.

In accordance with a preferable configuration, each communication device includes a timer for detecting the communication interval, and the time of the timers is synchronized among all of the communication devices based on a synchronization message transmitted from one of the plurality of communication devices.

According to the configuration, since the timers used to detect the communication interval is synchronized among the plurality of communication devices, even a message communicated among the communication devices can be detected based on the timers by which the communication interval of the message is synchronized. Thus, it is possible to expect an improvement in precision of the comparison result between the detected communication interval and the communication interval defined for the message. Accordingly, the determination of the validity of the message by the communication system becomes more suitable.

In accordance with a preferable configuration, the synchronization message is transmitted from the communication device transmitting the message.

According to the configuration, since the timer of the communication device receiving the message is synchronized to the timer of the communication device transmitting the message, higher precision detection of the communication interval of the communicated message is expected. Thus, the determination of the validity of the message by the communication system becomes more suitable.

BRIEF DESCRIPTION OF THE DRAWINGS

FIG. 7 is a sequence diagram illustrating a communication form of messages by a communication system according to another embodiment of the present invention; and FIG. 8 is a block diagram illustrating an overall configuration of a communication system according to a still another embodiment of the present invention.

DETAILED DESCRIPTION OF THE PREFERRED EMBODIMENTS

A communication system according to a first embodiment of the present invention will be described with reference to FIGS. 1 to 6.

Figure 1:
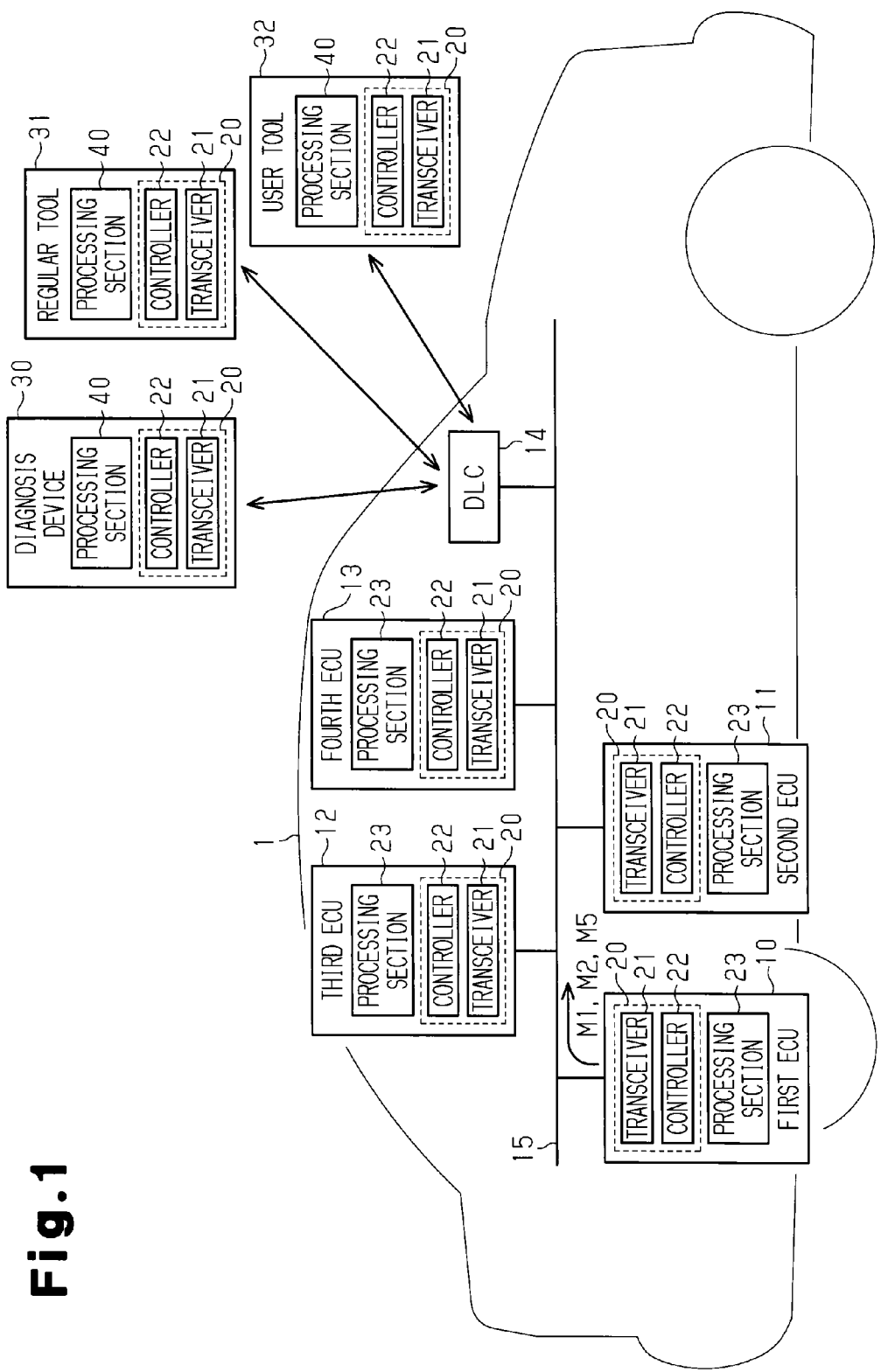
FIG. 1 is a block diagram illustrating an overall configuration of a communication system according to one embodiment of the present invention.

As illustrated in FIG. 1, a vehicle 1 includes an in-vehicle network system serving as a communication system. The vehicle network system includes first to fourth electronic control units (ECU) 10 to 13 and a communication bus 15, to which the first to fourth ECUs 10 to 13 are connected. Thus, the first to fourth ECUs 10 to 13 can exchange (transmit and receive) various kinds of information used for control or the like via the communication bus 15. The in-vehicle network system is configured as a CAN network, to which a CAN (Control Area Network) protocol is applied as a communication protocol. For example, according to the specification of a high-speed CAN, it is defined that a transmission rate is 500 kbps, the maximum bus length is 40 m, and the maximum number of connection nodes is 16. In addition, a data amount, which can be transmitted while being included in a data frame that is a frame of one unit in communication by the CAN protocol and is used for data transmission, is determined to be maximally 64 bit (8 bytes). The communication bus 15 is, for example, a twisted pair cable.

In the communication bus 15, a data link connector (DLC) 14 is installed as a connection terminal that can connect an external device to the communication bus 15 so that communication can be performed. As a regular communication device prepared by a manufacturer or a car dealer, for example, a diagnosis device 30 for diagnosing a vehicle state or the like or a regular tool 31, which is a device for updating software of the first to fourth ECUs 10 to 13, is connected in a wired manner to the DLC 14. The diagnosis device 30 diagnoses a vehicle state or the like based on vehicle information or the like collected from the first to fourth ECUs 10 to 13 via the communication bus 15. The regular tool 31 can be caused to rewrite the software stored in the first to fourth ECUs 10 to 13 for update, that is, to perform so-called reprogramming.

As a non-regular communication device prepared by a user, a user tool 32 can also be connected to the DLC 14. Since the user tool 32 is, for example, a non-regular tester or a smartphone, it is not necessarily guaranteed that there is no adverse influence on communication of the CAN when the user tool 32 is connected to the CAN. In particular, in a smartphone or the like, application software of speed display or the like arbitrarily selected by the user transmits and receives messages based on the CAN protocol. Since it is not sufficient to verify whether the communication by such application software is suitable for the CAN protocol, inconvenience occurs in communication, or a malicious function is included, the communication system requires monitoring messages to perform determination of validity of the messages.

Each of the first to fourth ECUs 10 to 13 is a control device used for various kinds of control of the vehicle 1 and is an ECU that controls, for example, a drive system, a travel system, a vehicle body system, or an information device system. An example of the ECU that controls a drive system includes an engine ECU, examples of the ECU that controls a travel system include a steering ECU or a brake ECU, examples of the ECU that controls the vehicle body system include a lighting ECU and a window ECU, and an example of the ECU that controls an information device system includes a car navigation ECU. The number of ECUs connected to the communication bus 15 is not limited to four, but may be three or less or may be five or more. Since the first to fourth ECUs 10 to 13 have the same configuration, the configuration of the first ECU 10 will be described below and the configurations of the second to fourth ECUs 11 to 13 will not be described.

The first ECU 10 includes a communication section 20 that communicates a message based on the CAN protocol via the communication bus 15 and a processing section 23 that performs a process necessary for various kinds of control and exchanges communication data with the communication section 20.

The processing section 23 is configured to include a microcomputer and includes an arithmetic device performing various processes and a storage device retaining arithmetic results, programs providing various control functions, and the like. The processing section 23 is provided with predetermined control functions by causing the arithmetic device to execute and process programs providing the predetermined control functions.

Various sensors (not illustrated) such as a speed sensor and an engine revolution sensor are connected to the processing section 23 via an input/output interface (not illustrated) of the first ECU 10, and thus the processing section 23 detects detection values of the sensors at a predetermined interval of, for example, 12 msec, 100 msec, or 500 msec.

The processing section 23 obtains communication data acquired via a message from the communication section 20 and supplies the communication section 20 with communication data desired to be transmitted. That is, the processing section 23 is configured to acquire various kinds of data necessary for a control function via the communication bus 15 and to transmit various kinds of data desired to be distributed to other ECUs to the communication bus 15.

Examples of the acquired communication data and the communication data desired to be distributed include data based on detection values of the various sensors and data based on information from an information system device. The data length of the data based on detection values of the various sensors is a data length falling in one data frame in many cases. Normally, transmission of the data is completed through communication of one message, but the message is transmitted periodically at detection intervals of a sensor. For the illustrative purposes, in the present embodiment, as for one message, a message which is transmitted periodically when communication is completed with the message is referred to as a periodic message. The data length of the data based on the information from the information system device is longer than a data length falling in one data frame. The information is divided into a plurality of pieces of data and a plurality of data frames storing the divided pieces of data are continuously communicated in sequence at predetermined intervals as messages. For the illustrative purposes, in the present embodiment, the messages continuously transmitting the divided pieces of data in sequence at the predetermined intervals are referred to as continuous messages. That is, the data transmission by the continuous messages is completed when all of the messages storing the plurality of divided pieces of data are communicated.

The communication section 20 includes a transceiver 21 and controller 22.

The transceiver 21 relays a message based on the CAN protocol between the communication bus 15 and the controller 22. Specifically, the transceiver 21 inputs a message communicated in the communication bus 15 to the controller 22 by converting electric characteristics of the message communicated in the communication bus 15 into electric characteristics suitable for the input to the controller 22. The transceiver 21 delivers a message output from the controller 22 to the communication bus 15 by converting electric characteristics of the message input from the controller 22 into electric characteristics suitable for communication in the communication bus 15.

The controller 22 is a so-called CAN controller, analyzes a received message to acquire communication data included in the message, and generates a message corresponding to the communication data input from the processing section 23 based on the communication data to transmit the message. That is, the controller 22 supplies the processing section 23 with communication data included in a message input from the transceiver 21 and outputs a message generated based on communication data input from the processing section 23 to the transceiver 21.

Figure 2:
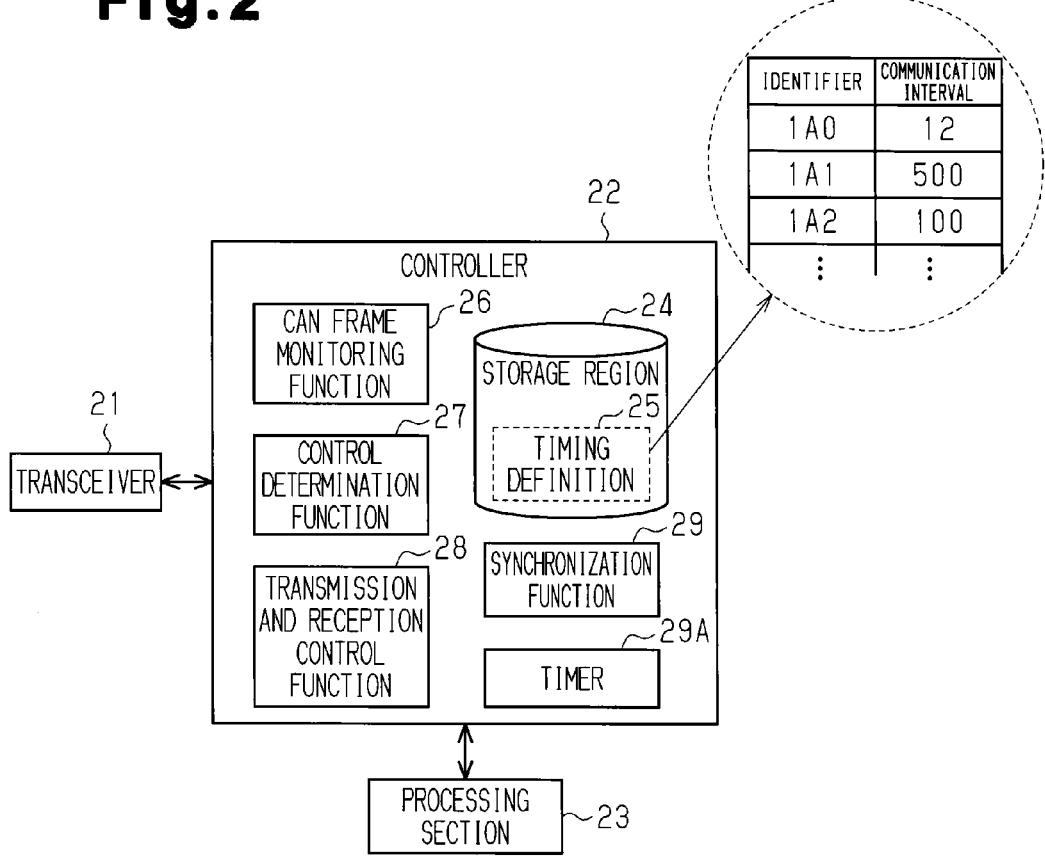
FIG. 2 is a block diagram illustrating an overall configuration of a controller illustrated in FIG. 1.

As illustrated in FIG. 2, in the present embodiment, the controller 22 has a storage region 24 for retaining various parameters or the like regarding determination of validity of a message, a CAN frame monitoring function 26 of monitoring a communication state of the CAN, and a control determination function 27 of determining a communication timing of a message. The controller 22 further has a transmission and reception control function 28 of transmitting a message based on the determination of the control determination function 27 and determining validity of a received message, a timer 29A used to measure communication intervals or the like, and a synchronization function 29 of ensuring synchronization of the timer 29A.

The storage region 24 is a region in which data ensured in a non-volatile memory, a hard disk, or the like can be retained and in which various parameters regarding the determination of validity of a message are retained as timing definitions 25. In the storage region 24, various parameters of the CAN protocol may be retained.

For the timing definitions 25, a communication interval defined for a message is retained for each kind of message. Since a kind of message is distinguished by an identifier (ID) given to the message in the CAN protocol, communication intervals defined for messages are retained to correspond to the identifiers in the timing definitions 25. In the timing definitions 25, for example, a communication interval 12 msec is retained to correspond to a message identifier 1A0, a communication interval 500 msec is retained to correspond to a message identifier 1A1, and a communication interval 100 msec is retained to correspond to a message identifier 1A2. That is, since the timing definitions 25 are set in the first to fourth ECUs 10 to 13, the defined communication intervals retained in the timing definitions 25 are shared among the first to fourth ECUs 10 to 13.

In the timing definitions 25, for example, a time at which transmission of a message starts, a condition under which transmission is stopped or paused, a timing at which synchronization control of a timer is performed, and a predetermined range serving as a criterion of determination of validity of a communication interval, for example, an error range or a margin period are retained as information necessary to determine validity of a message. The error range or the margin period is set based on an experiment, an experience, a simulation, or the like.

The CAN frame monitoring function 26 grasps a communication state of the communication bus 15 based on calculation of communication intervals of messages (frames) transmitted to the communication bus 15 by monitoring messages input from the transceiver 21 or calculation of a load state of the communication bus 15 with respect to the communication capacity.

The control determination function 27 determines whether transmission of a message is possible based on the communication state of the communication bus 15 obtained from the CAN frame monitoring function 26 and instructs the transmission and reception control function 28 of a transmission timing of a message communicated at the communication intervals defined in the timing definitions 25 stored in the storage region 24 when the transmission of the message is possible. That is, the control determination function 27 suppresses the transmission from the controller 22 when messages equal to or greater than a predetermined communication amount flows in the communication bus 15. In the present embodiment, the predetermined communication amount is set to an amount corresponding to 30% to 40% of the maximum communication capacity of the communication bus 15, but may be set to be less than 30% or greater than 40%.

The control determination function 27 acquires the communication intervals defined for the messages received by the transmission and reception control function 28 with reference to the timing definitions 25 and calculates the communication intervals of the received messages. The control determination function 27 calculates a difference by comparing the calculated communication interval and the defined communication interval. When the difference of the communication interval is within a predetermined error range, the control determination function 27 determines that the message is a regular message and instructs the transmission and reception control function 28 to process the message as usual. In contrast, when the difference of the communication interval exceeds the predetermined error range, the control determination function 27 determines that the message is an invalid message and instructs the transmission and reception control function 28 to discard the message. When the communication interval of the received message cannot be calculated, for example, when the number of received messages is only one, the control determination function 27 temporarily suspends the determination of the validity of the message and instructs the transmission and reception control function 28 to retain the received message.

The transmission and reception control function 28 transmits the message generated by the controller 22 via the transceiver 21 based on the communication data input from the processing section 23 according to the instruction of the control determination function 27. That is, after notifying the control determination function 27 of the identifier of the message to be transmitted, the transmission and reception control function 28 transmits the message at a transmission timing of which the control determination function 27 instructs in response to the notification. Therefore, the message is transmitted at the communication interval of which the control determination function 27 instructs, and the transmission of the message is stopped until the transmission is instructed from the control determination function 27.

Upon receiving the message, the transmission and reception control function 28 temporarily stores this message with the identifier and a reception time in the storage region 24 and notifies the control determination function 27 that the message is received. Then, the received message is processed according to the instruction received from the control determination function 27 in response to the notification. For example, when the transmission and reception control function 28 receives an instruction indicating the normal process from the control determination function 27, the transmission and reception control function 28 causes the controller 22 to analyze the targeting message and causes the processing section 23 to acquire the communication data. When the transmission and reception control function 28 receives an instruction indicating destruction of the message from the control determination function 27, the transmission and reception control function 28 discards the message by erasing the temporarily retained message or the like from the storage region 24. When the transmission and reception control function 28 receives an instruction indicating suspension from the control determination function 27, the transmission and reception control function 28 continues to retain the message in the storage region 24 by causing the message to be temporarily retained. When the communicated messages are the continuous messages and an invalid message is detected during the data transmission, the transmission and reception control function 28 may stop the reception of the subsequent messages.

The timer 29A is a so-called clock and a communication interval of two messages having the same identifier is measured within, for example, a range from several milliseconds to several seconds based on a measured time. Therefore, it is preferable that an error in a time between the ECU and another ECU communicating with the ECU during the measurement of the communication interval do not occur. Thus, the timer 29A can perform correction so that the measured time synchronizes with a timer of a master set in the communication system.

The synchronization function 29 is a function of synchronizing the time of the timer 29A to the other ECUs connected to the communication system. In the synchronization function 29, a master mode in which a time synchronization message M5 (see FIG. 1) used to give an instruction of a synchronization timing based on the time of the timer 29A and a slave mode in which the timer 29A is synchronized according to the received time synchronization message M5 are provided to be selectable. Thus, this synchronization is defined in the CAN protocol and is different from synchronization performed between the ECUs (nodes) to transmit and receive messages (frames) accurately.

In the present embodiment, the synchronization function 29 of the first ECU 10 is set to the master mode, and thus the synchronization function 29 generates the time synchronization message M5 and transmits the time synchronization message M5 to the communication bus 15 each time the timer 29A measures a predetermined time. A predetermined identifier (ID) is granted to the time synchronization message M5 and an elapsed time or the like after the previous transmission is included in the time synchronization message M5.

On the other hand, the synchronization functions 29 of the second to fourth ECUs 11 to 13 are set to the slave mode. That is, when the synchronization functions 29 of the second to fourth ECUs 11 to 13 receive the time synchronization message M5, the synchronization functions 29 synchronize an elapsed time of the timer 29A from the previous time synchronization message M5 to the current time synchronization message M5 to the elapsed time included in the time synchronization message M5, that is, correct the time of the timer 29A.

As illustrated in FIG. 1, the diagnosis device 30, the regular tool 31, and the user tool 32 each include the communication section 20 and a processing section 40.

The communication section 20 has the same function as the communication section 20 of the first ECU 10 described above and enables a message based on the CAN protocol to be communicated via the communication bus 15 connected via the DLC 14. That is, since the timing definitions 25 are set in each of the diagnosis device 30, the regular tool 31, and the user tool 32, the defined communication intervals retained in the timing definitions 25 are also shared with the diagnosis device 30, the regular tool 31, and the user tool 32 together with the first to fourth ECUs 10 to 13.

The processing section 40 is configured to include a microcomputer having performance capable of performing processes necessary for the diagnosis device 30, the regular tool 31, the user tool 32, and the like and includes an arithmetic device that performs various processes and a storage device that retains arithmetic results or programs providing various control functions, and the like. That is, the processing section 40 has the same function as the processing section 23 of the first ECU 10 described above and is provided with a predetermined function when a program providing the predetermined function is executed and processed by the arithmetic device. As in the processing section 23 of the first ECU 10, the processing section 40 obtains communication data from the communication section 20 and grants communication data desired to be transmitted to the communication section 20. That is, the processing section 40 can acquire various kinds of data necessary to provide functions via the communication bus 15 and transmit various kinds of data desired to be distributed to other ECUs to the communication bus 15.

Thus, as in the first ECU 10 described above, the diagnosis device 30, the regular tool 31, and the user tool 32 can transmit messages to the communication bus 15 at the communication intervals defined for the messages. As in the second ECU 11, the diagnosis device 30, the regular tool 31, and the user tool 32 can determine validity of the messages received from the communication bus 15 based on the communication intervals defined for the messages.

Next, a communication process enabling validity of messages to be determined will be described with reference to FIGS. 3 and 4.

In the present embodiment, the first to fourth ECUs 10 to 13, the diagnosis device 30, the regular tool 31, and the user tool 32 can all transmit and receive messages. However, for the illustrative purposes, only a case in which the first ECU 10 transmits messages and the second ECU 11 receives the transmitted messages will be described below. As the messages, there are the regular messages such as sensor detection values and the continuous messages such as information from the information system device, as described above. However, the process on the regular message is similar to the process on the continuous messages. Therefore, hereinafter, the process on the regular messages will mainly be described and only differences between the process on the continuous messages and the process on the regular messages will be described.

First, a case in which messages are transmitted will be described. This process is performed each time messages are transmitted.

Figure 3:
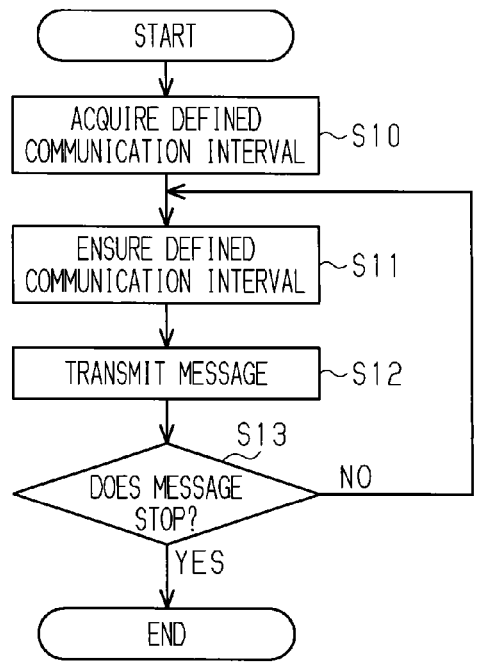
FIG. 3 is a flowchart illustrating a procedure in which the controller illustrated in FIG. 1 transmits a message.

As illustrated in FIG. 3, when transmission of a message starts in the first ECU 10, the controller 22 acquires a communication interval defined for the message (step S10). Thereafter, the communication interval is ensured based on a time measured by the timer 29A (step S11). Specifically, the controller 22 measures an elapsed time from a transmission timing of the message having the same identifier as that of the immediately previously transmitted message and waits to proceed to the subsequent step until the measured elapsed time becomes identical to the defined communication interval. When a message having the same identifier is not transmitted previously or previous transmission precedes the defined communication interval, it is not necessary to ensure the defined communication interval, and therefore, the process instantly proceeds to the subsequent step. For example, when the regular message is initially transmitted or the initial message among the continuous messages is transmitted, the process instantly proceeds to the subsequent step.

Then, the controller 22 transmits a message to be communicated to the communication bus 15 (step S12) and checks whether the message to be communicated remains, that is, the message to be communicated has stopped (step S13). When the controller 22 determines that the message to be communicated has stopped (YES in step S13), the transmission of the message ends.

In contrast, when the controller 22 determines that the message to be communicated has not stopped (NO in step S13), the process returns to step S11 to transmit the subsequent message and the above-described steps are repeated.

That is, in the case of the regular message, the number of messages to be transmitted is single, and thus the transmission of the message (step S12) ends at one time. On the other hand, in the case of the continuous messages, the number of messages to be transmitted is plural, and thus the transmission of the message (step S12) does not end at one time but is performed a plurality of times.

Next, a case in which a message is received will be described. This process is performed each time a message is received.

Figure 4:
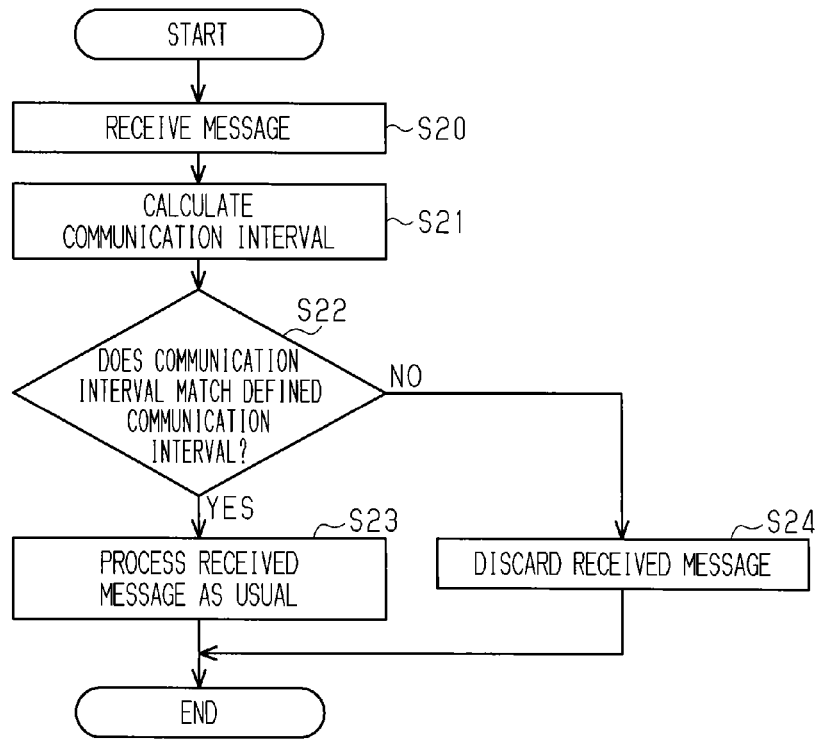
FIG. 4 is a flowchart illustrating a procedure in which the controller illustrated in FIG. 1 receives a message.

As illustrated in FIG. 4, when reception of the message starts in the second ECU 11, the controller 22 receives the communicated message (step S20) and calculates a communication interval corresponding to the received message (step S21). Then, the controller 22 determines whether the calculated communication interval matches the communication interval defined for the communicated message (step S22). The calculated communication interval is determined to match the defined communication interval when the calculated communication interval falls within an error range for the defined communication interval.

When the controller 22 determines that the calculated communication interval matches the defined communication interval (YES in step S22), the controller 22 determines that the received message is a regular message and normally processes the message as usual (step S23). Then, the reception of the message ends.

In contrast, when the controller 22 determines that the calculated communication interval does not match the defined communication interval (NO in step S22), the controller 22 determines that the received message is an invalid message and discards the received message (step S24).

That is, in the case of the regular message, the number of transmitted messages is single, and thus the communication ends here (the data transmission is completed). On the other hand, in the case of the continuous messages, the number of transmitted messages is plural, and thus the above-described processes are repeated until the final message is received and the communication then ends (the data transmission is completed).

Next, operation of the communication system will be described with reference to FIGS. 5 and 6. A transmission interval Tc1 corresponding to the defined communication interval is set in the first and second ECUs 10 and 11, and the second ECU 11 is configured to calculate a reception interval Tc2 as the communication interval calculated from the received message. Further, a first message M1 and a second message M2 are messages in which the same identifier is set.

Figure 5:
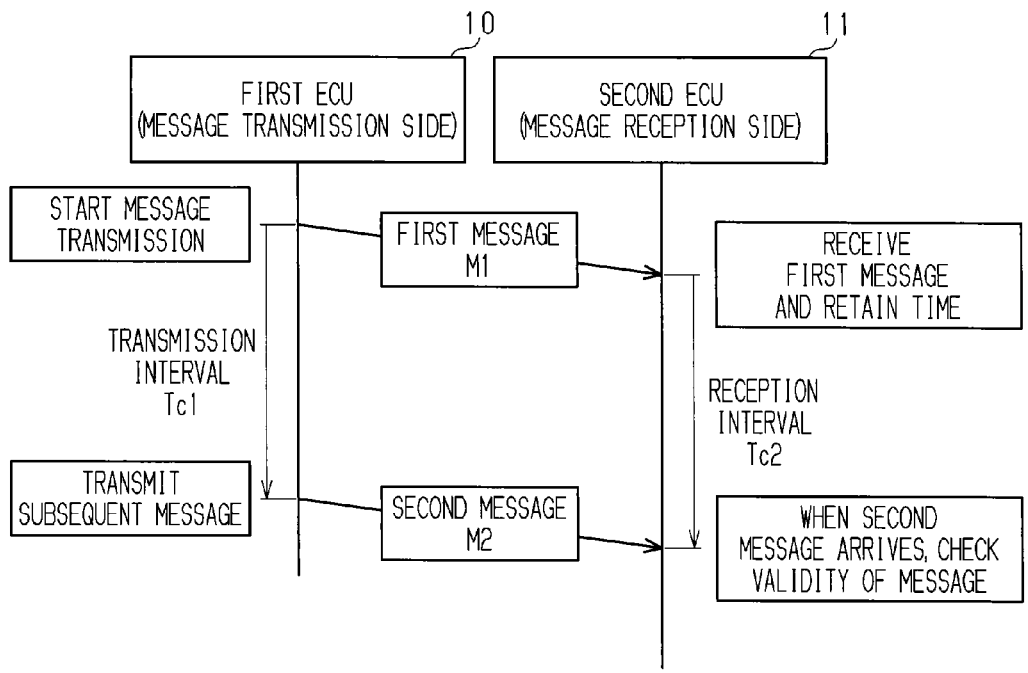
FIG. 5 is a sequence diagram illustrating a communication form of messages by the communication system illustrated in FIG. 1.

As illustrated in FIG. 5, when transmission of a message from the first ECU 10 starts, the second ECU 11 receives the first message M1, which is the initial message via the communication bus 15. The second ECU 11 having received the first message M1 in this way stores a reception time along with the identifier of the first message M1. When only one message is received, validity of the message cannot be determined. Therefore, in the case of the regular message, the second ECU 11 discards the message. The second ECU 11 may retain or may instantly use the regular message. On the other hand, in the case of the continuous messages, the data transmission is not completed unless all of the messages are received. Therefore, the message is preferably retained and stored.

Meanwhile, the first ECU 10 having transmitted the first message M1 waits for transmission of the subsequent second message M2 only for the transmission interval Tc1, which corresponds to the communication interval defined for the first message M1, and then transmits the second message M2 when the transmission interval Tc1 has passed. The second message M2 transmitted in this way is received by the second ECU 11 and the reception time is stored along with the identifier of the second message M2 in the second ECU 11 having received the second message M2.

Then, the second ECU 11 determines validity of the message M2 based on the reception of the two messages. That is, the second ECU 11 calculates the reception interval Tc2 as the communication interval between the messages and compares the calculated reception interval Tc2 to the transmission interval Tc1, which is a defined communication interval. When a difference between the calculated reception interval Tc2 and the defined transmission interval Tc1 is within the error range, which is a predetermined range, the received second message M2 is determined to be a regular message. At this time, the first message M1 may be determined to be also a regular message. In the case of the regular message, the first message M1 may be used, as necessary, but is configured to be discarded since it is the past data. On the other hand, in the case of the continuous messages, the first message M1 forms a part of the communication data. Therefore, the first message M1 is also determined to be a regular message and is processed as usual.

In contrast, when the difference between the calculated communication interval and the defined communication interval exceeds the error range, which is the predetermined range, the received second message M2 is determined to be an invalid message. Originally, at a time point where the second message is lastly received, it is impossible to specify which one between the first message M1 and the second message M2 is an invalid message. Therefore, the first message M1 cannot be determined to be a regular message.

Figure 6:
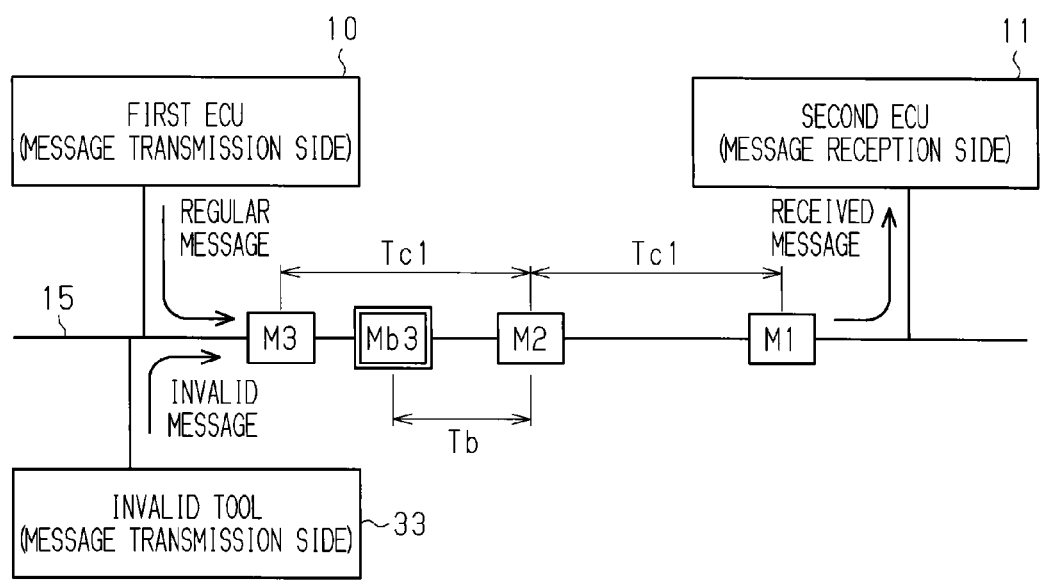
FIG. 6 is a schematic diagram for describing a form of determination of validity of messages by the communication system illustrated in FIG. 1.

As illustrated in FIG. 6, it is assumed that an invalid tool 33 is connected to the communication bus 15 and the invalid tool 33 transmits an invalid message Mb3 having the same identifier after the second message M2 transmitted by the first ECU 10. At this time, the second ECU 11 having received the invalid message Mb3 calculates a communication interval between the second message M2 and the invalid message Mb3 and compares the calculated communication interval to the defined communication interval (transmission interval Tc1) to obtain a difference (Tc1−Tb). At this time, since the difference (Tc1−Tb) exceeds an error range (for example, ±1 msec) for the transmission interval Tc1, the second ECU 11 determines that the invalid message Mb3 is an invalid message and discards the invalid message Mb3.

Thereafter, when the transmission interval Tc1 has passed after the transmission of the second message M2, the first ECU 10 transmits a third message M3. The third message M3 transmitted in this way is received by the second ECU 11. Then, the second ECU 11 compares the reception interval Tc2 calculated as the communication interval between the messages to the transmission interval Tc1, which is the defined communication interval. At this time, since the invalid message Mb3 is discarded, a reception time of the second message M2 is used in the calculation of a reception interval. Since a difference between the calculated reception interval Tc2 and the defined transmission interval Tc1 is within the error range, which is the predetermined range, the received third message M3 is determined to be a regular message and is processed as usual.

As described above, the communication system including the communication device according to the present embodiment has the advantages listed below.

(1) The first ECU 10 transmitting a message and the second ECU 11 receiving the message share a communication interval defined for the message communicated between the first and second ECUs 10 and 11. Thus, the second ECU 11 receiving the message can detect the communication interval (reception interval Tc2) of the received message and determine the validity of the communicated message based on the comparison between the detected communication interval and the defined communication interval (transmission interval Tc1). Specifically, the second ECU 11 receiving the message determines that the message received at the defined communication interval is a regular message and determines that the message received out of the defined communication interval is an invalid message. Since the invalid message (Mb3) mixed with the communicated messages is detected, the invalid message (Mb3) is excluded from the received messages (M1, M2, Mb3, and M3). That is, in the communication system, the validity of the messages communicated among the ECUs 10 to 13, the diagnosis device 30, the regular tool 31, and the user tool 32 is determined with a simple configuration.

(2) The validity of the message communicated by the CAN protocol can be determined based on the defined communication interval. In the CAN, the ECUs and the like connected to the communication bus 15 can start communication by self-determination, that is, each ECU and the like can transmit the message on the communication bus according to the circumstance. Therefore, addition or the like of an ECU, the user tool 32, the invalid tool 33, or the like to the communication bus 15 can be flexibly performed. Therefore, by simply determining the validity of the message, it is possible to improve reliability of a communication system configured by a CAN system.

(3) Since the communication interval of the message is normally determined for each identifier (IC) granted to the content of the message, that is, the content of each message in the CAN protocol, the management or selection of the defined communication interval is configured to be performed to correspond to the content of the message. The identifier can be recognized in the CAN by the controller 22 performing the message communication process conforming to the CAN protocol. Therefore, the controller 22 can easily select the communication interval defined based on the identifier and transmit the message at the defined communication interval. Thus, it is possible to improve the applicability as the communication system.

(4) Since the defined communication interval is selected based on the identifier recognizable by the controller 22, whether the message is received at the defined communication interval can be easily determined, that is, the validity of the message can be easily determined.

(5) Since the communication interval according to each of the plurality of types of messages is defined, the validity of the message can be determined for each of the plurality of types of communicated messages. Thus, the communication system can also determine validity of various messages to be communicated for the messages.

(6) Since the timer 29A used to detect the communication interval is synchronized among the plurality of ECUs and the like, even a message communicated among the ECUs can be detected based on the timer 29A, by which the communication interval of the message is synchronized. Thus, it is possible to expect an improvement in precision of the comparison result between the detected communication interval and the communication interval defined for the message. Accordingly, the determination of the validity of the message by the communication system becomes more suitable.

(7) Since the timer 29A of the second ECU 11 receiving the message is synchronized to the timer 29A of the first ECU 10 transmitting the message, higher precision detection of the communication interval of the communicated message is expected. Thus, the determination of the validity of the message by the communication system becomes more suitable.

OTHER EMBODIMENTS

The above described embodiments may be modified as follows.

In the above-described embodiment, the case in which the message is communicated at the defined communication interval has been described as an example. However, the present invention is not limited thereto. Even when a message is not communicated at a defined communication interval, it may be configured such that an invalid message can be determined properly.

For example, as illustrated in FIG. 7, when the first ECU 10 transmits a first message M1 and subsequently attempts to transmit a subsequent second message M2 at a timing at which a transmission interval Tc1 has passed, a message cannot be transmitted at this timing due to the circumstance on the communication bus in some cases. An example of the case in which a message cannot be transmitted includes a case in which when the first ECU 10 transmits a message, collision occurs, the first ECU 10 does not obtain a transmission right as a result of an arbitration, and the transmission is stopped. In this case, the transmission of the second message M2 from the first ECU 10 is slightly delayed. However, when an error range, for example, a margin period Tm, is set in consideration of a case in which arbitration occurs, the second ECU 11 can determine that the second message M2 received slightly late is a regular message.

For example, the first ECU 10 can be designed to wait only for a retransmission interval Tr determined in advance when the first ECU 10 cannot transmit the second message M2 at the defined communication interval. When it is determined that the first ECU 10 waits in this way, the second ECU 11 can compare a calculated communication interval (Tc2+Tr) to a defined communication interval (Tc1+Tr) to determine the validity of the received second message M2.

Further, collision occurring on the communication bus may be detected from an error frame defined in the CAN protocol and both of the transmission side and the reception side may perform communication at the defined transmission interval Tc1 from the timing of the detection or may wait only for a retransmission interval Tr from the timing of the detection and perform communication.

The second ECU 11 may add the margin period Tm to the error range in advance or as necessary or may expand the error range only by the margin period Tm in advance or as necessary.

As described above, even when the message is not communicated at the defined communication interval, the message can be efficiently transmitted by determining an invalid message, in other words, by not determining that a regular message is an invalid message. Thus, it is possible to improve the applicability of the communication system.

In the above-described embodiment, the case in which the elapsed time is included in the time synchronization message M5 has been described as an example. However, the present invention is not limited thereto. When a communication period of the time synchronization message is determined in advance, the elapsed time does not necessarily need to be included in the time synchronization message. Thus, it is possible to simplify the communication system and improve the degree of design flexibility.

In the above-described embodiment, the case has been described as an example in which the time of the timer 29A of each ECU is synchronized by the time synchronization message M5 transmitted from the transmission and reception control function 28. However, the present invention is not limited thereto. The timer of each ECU may be synchronized based on monitoring of a message periodically transmitted from the transmission and reception control function. Thus, it is also possible to simplify the communication system and improve the degree of design flexibility.

In the above-described embodiment, the case in which the synchronization function 29 is included in the controller 22 has been described as an example. However, the present invention is not limited thereto. When the communication interval can be properly measured, all the timers do not necessarily need to be synchronized. In this case, the communication system is simplified.

In the above-described embodiment, the case in which the invalid tool 33 (see FIG. 6) is directly connected to the communication bus 15 has been described as an example. However, the present invention is not limited thereto, but may be applied to a case in which an invalid tool is connected via the DLC. For example, even when a user tool that is an invalid tool and is connected to the DLC transmits an invalid message, the transmitted invalid message can be detected. Thus, the reliability of the communication system is improved.

In the above-described embodiment, the case in which an external device is connected to the DLC 14 in a wired manner has been described as an example. However, the present invention is not limited thereto. An external device may be connected to the DLC through wireless communication. For example, a wireless communication terminal may be connected to the DLC, an external device may also include a wireless communication device, and wireless communication may be performed between the DLC and the external device. In this case, the validity of a message can be determined irrespective of the connection form of the external device to the DLC.

In the above-described embodiment, the case has been described as an example in which there are the regular message such as a message output from a sensor and the continuous messages such as information from an information device as the messages. However, the present invention is not limited thereto. As the messages, substantially the same message may be transmitted a plurality of times, or communication by different messages may be all temporarily stopped and messages may be transmitted such that program data or the like for reprogramming is continuously sent using a lot of data frames. That is, when a message is communicated a plurality of times by the same identifier irrespective of communication data included in the message, the validity of the message can be determined by the communication system. Thus, it is possible to improve the convenience of the communication system and to improve the applicability.

In the above-described embodiment, the case has been described as an example in which the communication interval are statically set in advance in the first to fourth ECUs 10 to 13, the diagnosis device 30, the regular tool 31, and the like. However, the present invention is not limited thereto. The communication intervals may be dynamically set in the ECUs and the like. Specifically, as illustrated in FIG. 8, the first ECU 10 transmitting a message may transmit a communication interval defined according to the message to the second ECU 11 or the like receiving the message and may dynamically set the communication interval. Such dynamic setting of the communication interval may be performed such that a communication interval message M6 to which an identifier of the CAN protocol for setting the communication interval is granted is prepared and each ECU and the like may receive the communication interval message M6 and set the communication interval according to the identifier. Further, when the communication interval is set, an ECU determined in advance may transmit the communication interval to an ECU which is a communication destination and dynamically set the communication interval.

Thus, even when the communication interval defined for the communicated message is not set, the defined communication interval can be properly set in an ECU or the like receiving the message and the ECU or the like receiving the message can determine the validity of the communicated message based on the defined communication interval. Thus, it is possible to improve the applicability or convenience of the communication system.

Even for a message transmitted by a regular device such as a diagnosis device or a regular tool prepared by a manufacturer or a car dealer and connected to the communication bus via the data link connector, the communication interval defined for the message communicated from this device can be delivered to the communication system. Thus, in the communication system, it is possible to determine the validity of the message from the device connected via the data link connector.

Further, since the defined communication interval can be dynamically changed, it is possible to improve the security.

Accordingly, it is also possible to improve the applicability or convenience of the communication system.

In the above-described embodiment, the case in which one communication interval corresponds to the identifier of one message has been described as an example. However, the present invention is not limited thereto. A plurality of communication intervals having rules may be configured to correspond to the identifier of one message. For example, a message identifier 1A5 may be set such that two communication intervals 20 msec and 40 msec are alternately repeated. Thus, it is possible to further increase the types of messages for which the validity can be determined and to improve the security since imitation is difficult.

In the above-described embodiment, the case in which the communication interval is set for the message has been described as an example. However, the present invention is not limited thereto. When a communication interval of a message is defined, the communication interval defined for the message may be an interval ensured based on a communication period, may be an interval ensured based on a predetermined time, or may be an interval ensured based on a predetermined condition. That is, the communication period, the time, or the predetermined condition may be set as the communication interval. Thus, it is possible to increase the types of messages for which the validity can be determined.

In the above-described embodiment, the case in which the communication interval is defined for the message has been described as an example. However, the present invention is not limited thereto. The communication interval may be decided so that the security of the message is ensured between the ECUs and the like and the communication interval may be defined for the message for each ECU, diagnosis device, or the like. Thus, the setting of the definition of the communication interval becomes simple and the communication system can be easily applied.

In the above-described embodiment, the case in which the communication system is mounted on the vehicle 1 has been described as an example. However, the present invention is not limited thereto. A part or the whole of the communication system may be installed in an apparatus other than a vehicle. Thus, since the validity of a message can be determined even in a communication system formed by a CAN used in an apparatus other than a vehicle, it is possible to improve the applicability of the communication system.

In the above-described embodiment, the case in which the communication system is a system based on the CAN protocol has been described as an example. However, the present invention is not limited thereto. The communication system can also be applied to a communication protocol in which a plurality of communication devices can start communication at any timing, for example, a protocol in which arbitration is performed to properly give an access right when access to a communication line such as a bus is made. Thus, it is possible to improve the applicability of the communication system.

DESCRIPTION OF THE REFERENCE NUMERALS 1 vehicle
10 to 13 first to fourth electronic control units (ECU)
14 data link connector (DLC)
15 communication bus
20 communication section
21 transceiver
22 controller
23 processing section
24 storage region
25 timing definitions
26 CAN frame monitoring function
27 control determination function
28 transmission and reception control function
29 synchronization function
29A timer
30 diagnosis device
31 regular tool
32 user tool
33 invalid tool
40 processing section

The invention claimed is:

1. A communication system in which a plurality of communication devices including a first communication device and a second communication device are connected to a communication line to communicate a message, wherein
a defined communication interval is set for the message to be communicated in the communication devices, and
in a case that the first communication device transmits a message and the second communication device receives the message:
the first communication device includes a first controller circuitry configured to transmit the message based on the defined communication interval,
the second communication device includes a second controller circuitry configured to detect a communication interval of the received message,
the second controller circuitry is configured to use a criterion range set as a range in which a detected communication interval is determined to be normal,
the second controller circuitry is configured to determine validity of the received message based on a comparison between the criterion range and a difference range, the difference range including a range between the detected communication interval and the defined communication interval, and
the second controller circuitry is configured to set the criterion range to include an error between the defined communication interval and a communication interval when a new message is transmitted after a collision of messages being sent on the communication line at the same time so as not to determine that a regular message is an invalid message.

2. The communication system according to claim 1, wherein the criterion range is set based on an error occurring in the communication interval when a new message is transmitted after the collision of the messages being sent on a network at the same time or when a collided message is retransmitted.

3. The communication system according to claim 1, wherein
the first controller circuitry is configured to retransmit a collided message after a retransmission interval has passed when the message is not transmitted at the defined communication interval, and
when no message is transmitted at the defined communication interval, the retransmission interval is included in the defined communication interval.

4. The communication system according to claim 1, wherein
the communication line is a communication line conforming to a protocol of a control area network, and
the message based on the protocol of the control area network.

5. The communication system according to claim 4, wherein
the defined communication interval is caused to correspond to an identifier of the protocol of the control area network, and
the first communication device is configured to select the defined communication interval based on the identifier of the protocol of the control area network granted to the message.

6. The communication system according to claim 5, wherein the second communication device is configured to select the defined communication interval used for the determination of the validity of the message based on the identifier of the protocol of the control area network granted to the message.

7. The communication system according to claim 1, wherein
the message is one type of a plurality of types of messages, and
the communication interval is defined for each of the plurality of types of messages.

8. The communication system according to claim 1, wherein the defined communication interval is delivered from the first communication device to each communication device.

9. The communication system according to claim 1, wherein
each communication device includes a timer for detecting the communication interval, and the time of the timers is synchronized among all of the communication devices based on a synchronization message transmitted from one of the plurality of communication devices.

10. The communication system according to claim 9, wherein the first controller circuitry is configured to transmit the synchronization message.

11. A communication method used in a communication system in which a plurality of communication devices including a first communication device and a second communication device are connected to a communication line to communicate a message, the communication method comprising:

setting a defined communication interval for the message to be communicated in the communication devices, causing, by a first controller circuitry of the first communication device each time the first communication device transmits a message, the first communication device to transmit the message based on the defined communication interval, causing, by a second controller circuitry of the second communication device, the second communication device to detect a communication interval of the received message, setting, by the second communication device, a criterion range in which the detected communication interval is determined to be normal, determining validity of the received message based on a comparison between the criterion range and a difference range, the difference range including a range between the detected communication interval and the defined communication interval, and performing setting such that the criterion range includes an error between the defined communication interval and a communication interval when a new message is transmitted after a collision of messages being sent on the communication line at the same time so as not to determine that a regular message is an invalid message.

12. The communication method according to claim 11, further comprising communicating the message based on a protocol of a control area network.

* * * * *